UNITED STATES PATENT OFFICE.

FRANÇOIS CAMILLE CARTIER, OF PARIS, FRANCE.

DISINFECTANT.

SPECIFICATION forming part of Letters Patent No. 652,345, dated June 26, 1900.

Application filed May 13, 1899. Serial No. 716,742. (No specimens.)

*To all whom it may concern:*

Be it known that I, FRANÇOIS CAMILLE CARTIER, Directeur de la "Société Française de Désinfection" at Paris, a citizen of the Republic of France, residing at Paris, in the department of Seine, French Republic, have invented certain new and useful Improvements in Products for the Sterilizing of Germs, Micro-Organisms, and the Like; and I do declare the following to be a full, clear, and exact description of the invention, such as will enable others skilled in the art to which it appertains to make and use the same.

This invention relates to improved products for the sterilizing of germs, micro-organisms, and the like in an absolute and certain manner.

To carry this invention into effect, a solution of trioxymethylene dissolved in glycerin is mixed in suitable proportion with a solution of tincture of Dutch mustard-seed (*tincture de Seneve de Holland*) dissolved in alcohol.

I have to observe that each of the bodies— trioxymethylene and tincture of Dutch mustard—when taken by themselves have not any destroying power for the germs or micro-organisms; but that the mixture of their solutions, as it is explained above, gives results of sterilization really remarkable.

The proportions of the elements constituting the new antiseptic product which have been found to give the best results are the following: To one liter of the first solution, consisting of twenty-five per cent. of trioxymethylene and fifteen per cent. of pure glycerin, is added the second solution, consisting of 2.50 grams of the tincture of Dutch mustard-seed dissolved in three grams of alcohol at 95°. These two latter bodies ought to be mixed previously, and only when the liquid has become clear is it to be mixed to a liter of the first solution.

The product is an antiseptic liquid which can be used in any of the well-known ways. It is to be diluted with from five hundred to six thousand parts of water, according to the purpose for which the solution is intended. It is especially valuable in sterilizing instruments, in bathing the hands of the surgeon and his assistants, in spraying wounds, and in destroying fetid odors and the like.

Having now particularly described and ascertained the nature of this said invention and in what manner the same is to be performed, I declare that what I claim is—

An improved product for the sterilization of germs micro-organisms or the like consisting of a solution of trioxymethylene in glycerin mixed with a solution of tincture of Dutch mustard-seed in alcohol, substantially as described.

In testimony whereof I affix my signature in presence of two witnesses.

FRANÇOIS CAMILLE CARTIER.

Witnesses:
HENRY DANZER,
EDWARD P. MACLEAN.